United States Patent
Takobe et al.

(10) Patent No.: US 12,160,172 B2
(45) Date of Patent: Dec. 3, 2024

(54) OUTPUT FEEDBACK CONTROL CIRCUIT AND SWITCHING POWER SUPPLY INCLUDING THE SAME

(71) Applicant: Rohm Co., Ltd., Kyoto (JP)

(72) Inventors: Isao Takobe, Kyoto (JP); Masashi Nagasato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 240 days.

(21) Appl. No.: 17/777,137

(22) PCT Filed: Dec. 3, 2020

(86) PCT No.: PCT/JP2020/045080
§ 371 (c)(1),
(2) Date: May 16, 2022

(87) PCT Pub. No.: WO2021/124910
PCT Pub. Date: Jun. 24, 2021

(65) Prior Publication Data
US 2022/0393596 A1 Dec. 8, 2022

(30) Foreign Application Priority Data
Dec. 17, 2019 (JP) ................................. 2019-227311

(51) Int. Cl.
*H02M 3/158* (2006.01)
*H02M 1/00* (2006.01)
*H02M 1/08* (2006.01)

(52) U.S. Cl.
CPC ....... *H02M 3/1588* (2013.01); *H02M 1/0009* (2021.05); *H02M 1/08* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 4,980,651 A 12/1990 Koullias
5,600,234 A 2/1997 Hastings et al.
(Continued)

FOREIGN PATENT DOCUMENTS

CN 110098737 8/2019
DE 112018007757 3/2021
(Continued)

OTHER PUBLICATIONS

International Search Report in International Appln. No. PCT/JP2020/045080, dated Feb. 2, 2021, 6 pages.
(Continued)

*Primary Examiner* — Thienvu V Tran
*Assistant Examiner* — Nusrat Quddus
(74) *Attorney, Agent, or Firm* — Fish & Richardson P.C.

(57) ABSTRACT

An output feedback control circuit includes, as a means for generating an error signal ERR between a feedback voltage FB commensurate with an output voltage and a reference voltage REF (means for substituting for a single error amplifier 140), a first signal processor (for example, an amplifier 140a) that forms a first path, and a second signal processor (for example, an amplifier 140b) that forms a second path. The amplifier 140a is more accurate than the amplifier 140b, and the amplifier 140b is faster than the amplifier 140a. To the output terminal of the amplifier 140a, preferably, a capacitor Cc other than a parasitic element is connected. To the output terminal of the amplifier 140b, preferably, no capacitor other than a parasitic element is connected, and a resistor Rc is connected. Preferably, the amplifier 140a has a transconductance gm1, and the amplifier 140b has a transconductance gm2 (≠gm1).

17 Claims, 15 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/30; G05F 1/33; G05F 1/32; G05F 1/34; G05F 1/38; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H02M 1/12; H02M 3/3155; H02M 3/33507; H02M 3/33546; H02M 7/1557; H02M 7/1626; H02M 1/4208; H02M 7/219; H02M 7/151; H02M 1/4233; H02M 5/4585; H02M 1/08; H02M 7/1552; H02M 7/1623; H02M 1/4225; H02M 3/33592; H02M 3/137; H02M 7/00; H02M 7/064; H05B 39/048; B23K 11/24; H04B 2215/069; H02J 3/46; H02J 3/38; H02J 7/12

See application file for complete search history.

(56) References Cited

U.S. PATENT DOCUMENTS

| | | | | |
|---|---|---|---|---|
| 5,631,968 | A * | 5/1997 | Frey | H03G 7/002 |
| | | | | 381/106 |
| 7,002,409 | B1 | 2/2006 | Aram | |
| 7,936,160 | B1 * | 5/2011 | Sheehan | H02M 3/156 |
| | | | | 323/288 |
| 9,086,710 | B1 * | 7/2015 | Milanesi | G05F 1/445 |
| 9,866,113 | B1 * | 1/2018 | Assaad | H02M 3/158 |
| 10,063,146 | B1 * | 8/2018 | Lee | G01R 19/003 |
| 10,310,528 | B1 * | 6/2019 | Elsayed | G05F 1/565 |
| 10,601,318 | B2 | 3/2020 | Flaibani et al. | |
| 10,848,060 | B1 * | 11/2020 | Unno | H02M 3/158 |
| 11,405,008 | B2 * | 8/2022 | Nagasato | H02M 3/158 |
| 11,664,775 | B2 * | 5/2023 | Nagasato | H03F 3/2171 |
| | | | | 330/253 |
| 12,047,045 | B2 | 7/2024 | Nagasato et al. | |
| 2005/0140347 | A1 * | 6/2005 | Chen | H02M 3/1584 |
| | | | | 323/282 |
| 2007/0085523 | A1 * | 4/2007 | Scoones | H02M 3/158 |
| | | | | 323/314 |
| 2008/0049478 | A1 | 2/2008 | Wong et al. | |
| 2008/0068091 | A1 * | 3/2008 | Kwan | H03L 7/02 |
| | | | | 331/16 |
| 2009/0184701 | A1 * | 7/2009 | Yen | H02M 3/156 |
| | | | | 323/283 |
| 2010/0060257 | A1 * | 3/2010 | Azrai | G01R 19/0092 |
| | | | | 324/76.11 |
| 2011/0057645 | A1 * | 3/2011 | Jager | B60T 8/36 |
| | | | | 324/125 |
| 2011/0187334 | A1 * | 8/2011 | Yamamoto | G05F 1/575 |
| | | | | 323/265 |
| 2011/0204860 | A1 * | 8/2011 | Thiele | H02M 3/156 |
| | | | | 323/271 |
| 2011/0234188 | A1 * | 9/2011 | Chiu | H02M 1/14 |
| | | | | 323/282 |
| 2011/0291626 | A1 | 12/2011 | Murakami | |
| 2014/0084883 | A1 * | 3/2014 | Tanabe | H02M 3/1582 |
| | | | | 323/271 |
| 2014/0097902 | A1 | 4/2014 | Chen et al. | |
| 2014/0107857 | A1 | 4/2014 | Yang et al. | |
| 2014/0368366 | A1 * | 12/2014 | Galton | H03M 3/386 |
| | | | | 341/143 |
| 2015/0244262 | A1 | 8/2015 | Ouyang | |
| 2016/0087543 | A1 * | 3/2016 | Jin | H02M 1/38 |
| | | | | 363/21.03 |
| 2016/0344352 | A1 * | 11/2016 | Chang | H03F 3/45197 |
| 2017/0201086 | A1 * | 7/2017 | Chen | H03K 3/017 |
| 2018/0367022 | A1 | 12/2018 | Gopalraju et al. | |
| 2019/0036453 | A1 * | 1/2019 | Masuch | H02M 1/08 |
| 2019/0081546 | A1 * | 3/2019 | Hsu | H02M 3/158 |
| 2019/0097535 | A1 | 3/2019 | Otsuka | |
| 2019/0238054 | A1 | 8/2019 | Flaibani et al. | |
| 2021/0257978 | A1 | 8/2021 | Nagasato et al. | |
| 2022/0247371 | A1 | 8/2022 | Nagasato et al. | |
| 2022/0345040 | A1 * | 10/2022 | Couleur | H02M 1/0009 |
| 2023/0146300 | A1 * | 5/2023 | Takobe | H02M 3/158 |
| | | | | 323/271 |
| 2023/0261625 | A1 | 8/2023 | Nagasato et al. | |

FOREIGN PATENT DOCUMENTS

| | | |
|---|---|---|
| JP | H09-64663 | 3/1997 |
| JP | 2003-060934 | 2/2003 |
| JP | 2018153079 | 9/2018 |
| JP | 2019-009548 | 1/2019 |
| JP | 2019-058027 | 4/2019 |
| JP | 2019-083686 | 5/2019 |

OTHER PUBLICATIONS

JP OA—Japanese Patent Office, Office Action in Japanese Appln. No. 2021-565460, dated Jun. 11, 2024, 9 pages (with English translation).

DE OA—The German Patent and Trademark Office, Office Action in German Appln. No. 112020006170.1, dated Jul. 24, 2024, 6 pages (with English translation).

* cited by examiner

OUTPUT FEEDBACK CONTROL CIRCUIT AND SWITCHING POWER SUPPLY INCLUDING THE SAME

TECHNICAL FIELD

The invention disclosed herein relates to an output feedback control circuit.

BACKGROUND ART

In general, switching power supplies, servo mechanisms, and the like incorporate an output feedback control circuit that performs output feedback control such that the output voltage remains equal to a predetermined reference voltage.

An example of known technology related to what has just been mentioned is seen in Patent Document 1 identified below.

LIST OF CITATIONS

Patent Literature

Patent Document 1: Japanese unexamined patent application publication No. 2019-58027

SUMMARY OF THE INVENTION

Problem to be Solved by the Invention

Inconveniently, conventional output feedback control circuits have room for further improvement in terms of achieving high speed and enhanced accuracy simultaneously.

In view of the above-mentioned problem encountered by the present inventors, an object of the invention disclosed herein is to provide an output feedback control circuit that can achieve high speed and enhanced accuracy simultaneously.

Means for Solving the Problem

According to one aspect of what is disclosed herein, an output feedback control circuit includes, as a means for generating an error signal between an output voltage, or a feedback voltage commensurate with it, and a predetermined reference voltage, a first signal processor configured to form a first path, and a second signal processor configured to form a second path. The first signal processor is configured to be more accurate than the second signal processor, and the second signal processor is configured to be faster than the first signal processor (a first configuration).

In the output feedback control circuit according to the first configuration described above, preferably, the first signal processor includes a first amplifier, and the second signal processor includes a second amplifier (a second configuration).

In the output feedback control circuit according to the first configuration described above, preferably, to the output terminal of the first amplifier, a capacitor other than a parasitic element is connected (a third configuration).

In the output feedback control circuit according to the second or third configuration described above, preferably, to the input terminal of the first amplifier, a digital calibrator configured to correct an input error is connected (a fourth configuration).

In the output feedback control circuit according to any of the second to fourth configurations described above, preferably, to the output terminal of the second amplifier, no capacitor other than a parasitic element is connected (a fifth configuration).

In the output feedback control circuit according to any of the second to fifth configurations described above, preferably, to the output terminal of the second amplifier, a resistor is connected (a sixth configuration).

In the output feedback control circuit according to any of the second to sixth configurations described above, preferably, the first amplifier is configured to have a first transconductance, and the second amplifier is configured to have a second transconductance different from the first transconductance (a seventh configuration).

The output feedback control circuit according to any of the second to seventh configurations described above is, preferably, configured to determine a low-frequency gain using the first amplifier and a high-frequency gain using the second amplifier (an eighth configuration).

In the output feedback control circuit according to any of the second to eighth configurations described above, preferably, the first and second amplifiers are configured to generate, respectively, first and second error signals commensurate with the difference between the output voltage or the feedback voltage and the reference voltage (a ninth configuration).

The output feedback control circuit according to the ninth configuration described above, preferably, further includes a calculator configured to generate the error signal by performing addition or subtraction between the first and second error signals (a tenth configuration).

The output feedback control circuit according to the tenth configuration described above, preferably, further includes a buffer between the output terminal of the first amplifier and the calculator (an eleventh configuration).

In the output feedback control circuit according to any of the second to eighth configurations described above, preferably, the first amplifier is configured to generate a first error signal commensurate with the difference between the output voltage or the feedback voltage and the reference voltage, and the second amplifier is configured to generate a second error signal commensurate with the difference between the output voltage, the feedback voltage, or the reference voltage and the first error signal to output it as the error signal (a twelfth configuration).

According to another aspect of what is disclosed herein, a switching power supply includes a switching output circuit configured to generate an output voltage from an input voltage, and the output feedback control circuit according to any of the first to twelfth configurations described above which is configured to receive the output voltage, or the feedback voltage commensurate with it, to perform output feedback control for the switching output circuit (a thirteenth configuration).

In the switching power supply according to the thirteenth configuration described above, preferably, the output feedback control circuit is configured to drive the switching output circuit by fixed-frequency operation so as to reduce the error signal (a fourteenth configuration).

In the switching power supply according to the thirteenth configuration described above, preferably, the output feedback control circuit is configured to drive the switching output circuit by fixed on-time operation so as to reduce the error signal (a fifteenth configuration).

In the switching power supply according to any of the thirteenth to fifteenth configurations described above, preferably, the output feedback control circuit includes a low-side current sensor configured to sense an inductor current passing through a low-side switch in the switching output circuit to acquire low-side current feedback information, and an information synthesizer configured to combine the error signal, which is voltage feedback information, with the low-side current feedback information to generate synthesized feedback information. The output feedback control circuit is, preferably, configured to drive the switching output circuit based on the synthesized feedback information (a sixteenth configuration).

Advantageous Effects of the Invention

With the invention disclosed herein, it is possible to provide an output feedback control circuit that can achieve high speed and enhanced accuracy simultaneously.

DESCRIPTION OF EMBODIMENTS

Figure 1:
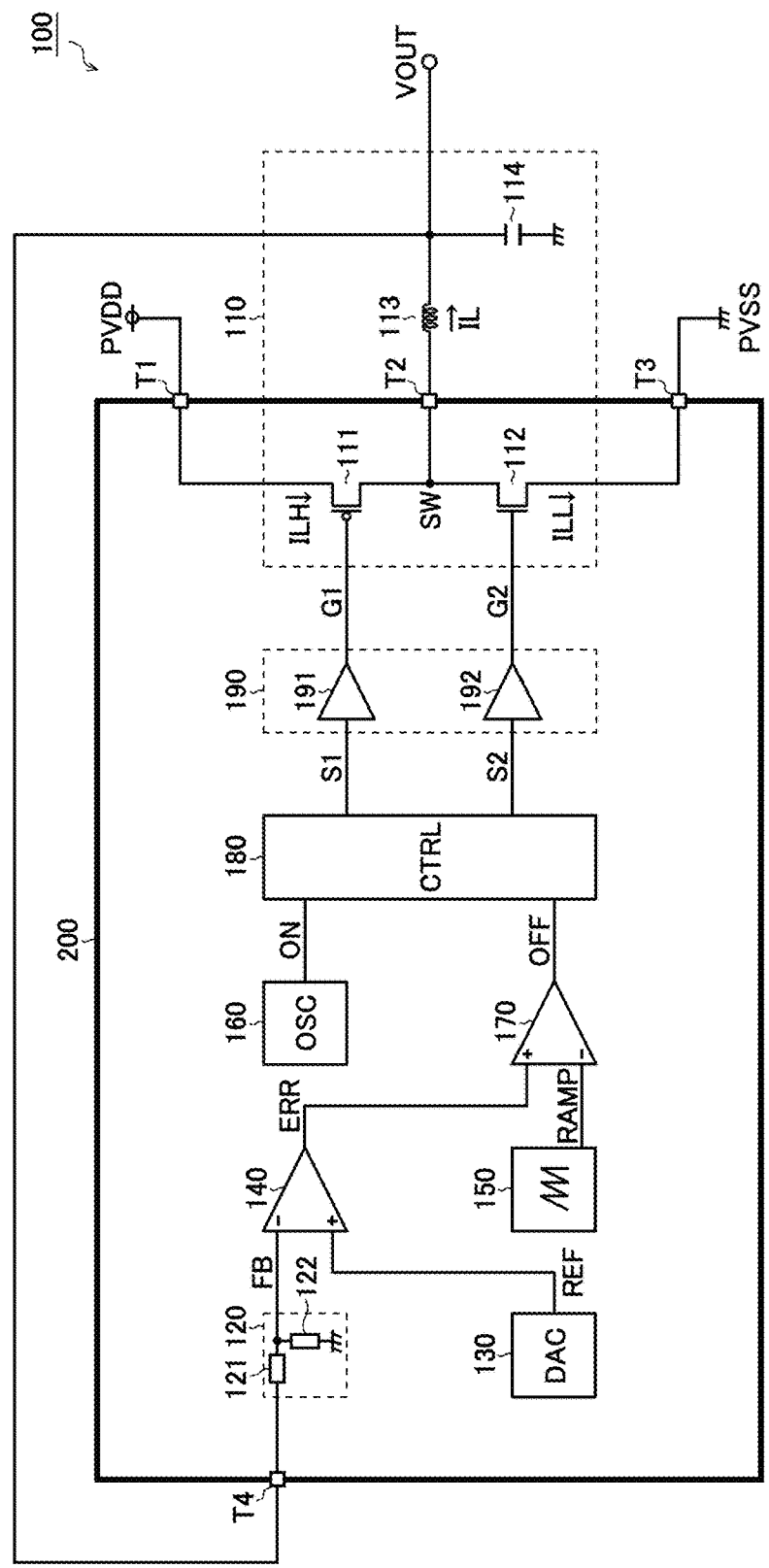
FIG. 1 is a diagram showing a basic configuration of a switching power supply.

FIG. 1 is a diagram showing a basic configuration of a switching power supply. The switching power supply 100 of this configuration example is a PWM (pulse width modulation) DC-DC converter that generates from an input voltage PVDD an output voltage VOUT to feed it to an unillustrated load. The switching power supply 100 includes a switching output circuit 110, a feedback voltage generation circuit 120, a reference voltage generation circuit 130, an error amplifier 140, a ramp signal generation circuit 150, an oscillator 160, a PWM comparator 170, a control circuit 180, and a switch driving circuit 190.

Preferably, the circuit elements mentioned above are, except some of them (an inductor 113 and a capacitor 114 in FIG. 1) included in the switching output circuit 110, integrated into a semiconductor integrated circuit device 200 (what is called a power control IC) that serves as the main controlling agent in the switching power supply 100. The semiconductor integrated circuit device 200 can have any circuit elements (such as various types of protection circuits) other than those enumerated above incorporated into it as necessary.

The semiconductor integrated circuit device 200 includes, as a means for establishing electrical connection with outside the device, a plurality of external terminals (FIG. 1 shows, as an example, four terminals, namely a power terminal T1, an output terminal T2, a ground terminal T3, and a feedback terminal T4).

The switching output circuit 110 is a bucking (step-down) switching output stage which, by turning on and off high-side and low-side switches that are connected together to form a half bridge, drives an inductor current IL to generate the output voltage VOUT from the input voltage PVDD. The switching output circuit 110 includes an output transistor 111, a synchronous rectification transistor 112, an inductor 113, and a capacitor 114.

The output transistor 111 is a PMOSFET (P-channel metal-oxide-semiconductor field-effect transistor) that functions as a high-side switch in the switching output stage. Inside the semiconductor integrated circuit device 200, the source of the output transistor 111 is connected to the power terminal T1 (that is, an application terminal for the input voltage PVDD). The drain of the output transistor 111 is connected to the output terminal T2 (that is, an application terminal for a switching voltage SW). The gate of the output transistor 111 is connected to an application terminal for a high-side gate signal G1. The output transistor 111 is off when the high-side gate signal G1 is at high level and is on when the high-side gate signal G1 is at low level.

The synchronous rectification transistor 112 is an NMOSFET (N-channel MOSFET) that functions as a low-side switch in the switching output stage. Inside the semiconductor integrated circuit device 200, the source of the synchronous rectification transistor 112 is connected to the ground terminal T3 (that is, an application terminal for a ground voltage PVSS). The drain of the synchronous rectification transistor 112 is connected to the output terminal T2. The gate of the synchronous rectification transistor 112 is connected to an application terminal for a low-side gate signal G2. The synchronous rectification transistor 112 is on when the low-side gate signal G2 is at high level and is off when the low-side gate signal G2 is at low level.

The inductor 113 and the capacitor 114 are discrete components that are externally connected to the semiconductor integrated circuit device 200. The inductor 113 and the capacitor 114 form an LC filter that rectifies and smooths the switching voltage SW to generate the output voltage VOUT. Outside the semiconductor integrated circuit device 200, the first terminal of the inductor 113 is connected to the output terminal T2 of the semiconductor integrated circuit device 200. The second terminal of the inductor 113 and the first terminal of the capacitor 114 are connected to an application terminal for the output voltage VOUT and to the feedback terminal T4. The second terminal of the capacitor 114 is connected to a grounded terminal.

The output transistor 111 and the synchronous rectification transistor 112 are turned on and off complementarily in accordance with the high-side and low-side gate signals G1 and G2. Such on/off operation generates at the first terminal of the inductor 113 the switching voltage SW with a rectangular waveform that is pulse-driven between the input voltage PVDD and the ground voltage GND. Here, the term "complementarily" covers not only operation where the on/off states of the output transistor 111 and the synchronous rectification transistor 112 are completely reversed, but also operation where there is provided a period (a dead time) in which both transistors are simultaneously off.

The output type of the switching output circuit 110 is not limited to a bucking type as mentioned above; it may instead be any of a boosting (step-up) type, a boost/buck (step-up/-down) type, and an inverting type. Likewise, the rectification type of the switching output circuit 110 is not limited to a synchronous rectification type as mentioned above; it may instead be a diode rectification type using a rectifier diode as the low-side switch.

The output transistor 111 can be replaced with an NMOS-FET. In that case, a bootstrap circuit or a charge pump circuit is needed to raise the high level of the high-side gate signal G1 up to a voltage value higher than the input voltage PVDD.

A configuration is also possible where the output transistor 111 and the synchronous rectification transistor 112 are externally connected to the semiconductor integrated circuit device 200. In that case, instead of the output terminal T2, terminals for feeding out the high-side and low-side gate signals G1 and G2 respectively are needed.

In particular, in applications where a high voltage is applied to the switching output circuit 110, as the output transistor 111 and the synchronous rectification transistor 112, high-withstand-voltage elements such as power MOSFETs and IGBTs (insulated gate bipolar transistors) or SiC transistors and GaN transistors can be used respectively.

The feedback voltage generation circuit 120 includes resistors 121 and 122 which are connected in series between the feedback terminal T4 (that is, the application terminal for the output voltage VOUT) and a grounded terminal. The feedback voltage generation circuit 120 yields from the connection node between the resistors a feedback voltage FB (that is, a division voltage of the output voltage VOUT) commensurate with the output voltage VOUT.

In a case where the output voltage VOUT is within the input dynamic range of the error amplifier 140, the feedback voltage generation circuit 120 may be omitted, in which case the output voltage VOUT can be fed directly to the error amplifier 140. Or, a capacitor may be connected in parallel with a resistor 121.

Yet another configuration is possible where the resistors 121 and 122 are externally connected to the semiconductor integrated circuit device 200. In that case, the connection node between the resistors 121 and 122 can be connected to the feedback terminal T4.

The reference voltage generation circuit 130 generates a predetermined reference voltage REF (corresponding to a set target value of the output voltage VOUT). For the reference voltage generation circuit 130, a DAC (digital-to-analog converter) can be used which converts a digital reference voltage setting signal to an analog reference voltage REF. With this configuration, it is possible, by using the just-mentioned reference voltage setting signal, to achieve soft starting at start-up and to adjust the output voltage VOUT.

The error amplifier 140 generates an error signal ERR that is commensurate with the difference between the feedback voltage FB, which is fed to the inverting input terminal (−) of the error amplifier 140, and the reference voltage REF, which is fed to the non-inverting input terminal (+) of the error amplifier 140. The error signal ERR rises when the feedback voltage FB is lower than the reference voltage REF and falls when the feedback voltage FB is higher than the reference voltage REF.

The ramp signal generation circuit 150 generates a ramp signal RAMP that rises during the on-period Ton of the output transistor 111 with a triangular waveform, a saw-tooth-shaped waveform, or an nth-order slope waveform (e.g., n=2). The ramp signal RAMP, for example, starts to rise from a zero value at the turn-on of the output transistor 111, and is reset to a zero value at the turn-off of the output transistor 111.

The oscillator 160 generates an on signal ON (that is, a clock signal) that is pulse-driven at a predetermined switching frequency fsw (=1/Tsw).

The PWM comparator 170 generates an off signal OFF by comparing the error signal ERR, which is fed to the non-inverting input terminal (+) of the PWM comparator 170, with the ramp signal RAMP, which is fed to the inverting input terminal (−) of the PWM comparator 170. The off signal OFF is at high level when the ramp signal RAMP is lower than the error signal ERR, and is at low level when the ramp signal RAMP is higher than the error signal ERR. That is, the higher the error signal ERR, the later the occurrence of a pulse in the off signal OFF, and the lower the error signal ERR, the earlier the occurrence of a pulse in the off signal OFF.

The control circuit 180 generates a high-side control signal S1 and a low-side control signal S2 in accordance with the on signal ON and the off signal OFF. Specifically, the control circuit 180, when a pulse occurs in the on signal ON, turns both the high-side and low-side control signals S1 and S2 to low level (that is, the logic level that keeps the switching voltage SW at high level) and, when a pulse occurs in the off signal OFF, turns both the high-side and low-side control signals S1 and S2 to high level (that is, the logic level that keeps the switching voltage SW at low level).

Thus, the later the occurrence of a pulse in the off signal OFF, the longer the on-period Ton of the output transistor 111 (that is, the high-level period of the switching voltage SW); the earlier the occurrence of a pulse in the off signal OFF, the shorter the on-period Ton. That is, the higher the error signal ERR, the higher the on-duty D (=Ton/Tsw) of the output transistor 111, and the lower the error signal ERR, the lower the on-duty D.

The switch driving circuit 190 includes a high-side driver 191, which receives the high-side control signal S1 to generate the high-side gate signal G1, and a low-side driver 192, which receives the low-side control signal S2 to generate the low-side gate signal G2. For each of the high-side and low-side drivers 191 and 192, a buffer or an inverter can be used.

Of the circuit elements mentioned above, at least the error amplifier 140, the ramp signal generation circuit 150, the oscillator 160, the PWM comparator 170, the control circuit 180, and the switch driving circuit 190 can be understood as an output feedback control circuit that performs output feedback control to keep the feedback voltage FB (and hence the output voltage VOUT) equal to the predetermined reference voltage REF.

In particular, with the output feedback control circuit described above, the switching output circuit 110 is driven by fixed-frequency operation so as to reduce the error signal.

First Embodiment

Figure 2:
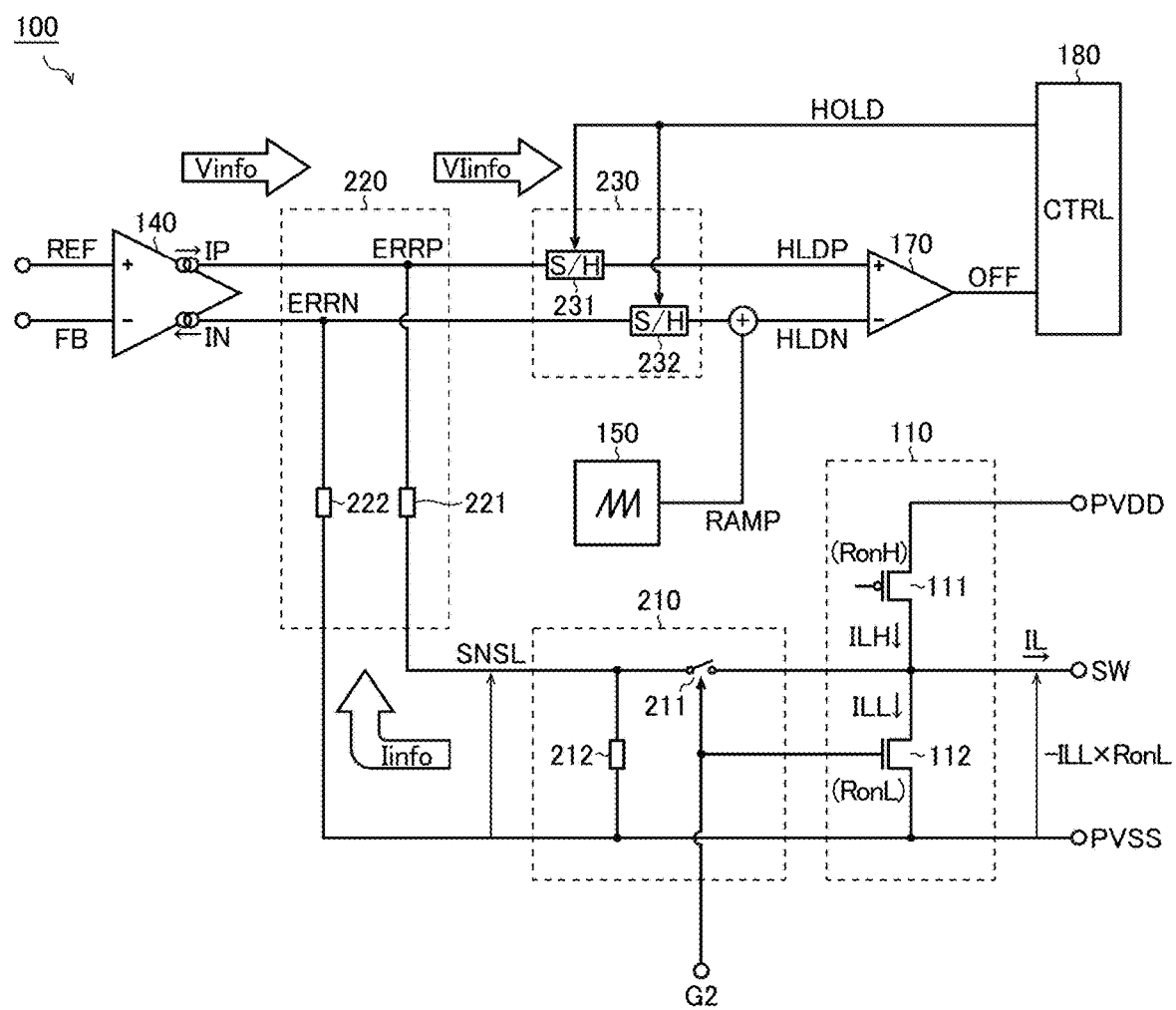
FIG. 2 is a diagram showing a switching power supply according to a first embodiment.

FIG. 2 is a diagram showing a switching power supply 100 according to a first embodiment. As a means for achieving output feedback control of a current mode control type, the switching power supply 100 according to this embodiment includes, in addition to the circuit elements described previously (in FIG. 2, the switching output circuit 110, the error amplifier 140, the ramp signal generation circuit 150, the oscillator 160, the PWM comparator 170, and the control circuit 180 are expressly shown), a low-side current sensor 210, an information synthesizer 220, and an information holder 230.

In the switching power supply 100 according to this embodiment, as the error amplifier 140 that acquires voltage feedback information Vinfo in accordance with the output voltage VOUT (and hence the feedback voltage FB), a current-output amplifier is used which outputs differential current signals IP and IN. The differential current signals IP and IN are currents that pass in opposite directions, and increase and decrease in accordance with the difference between the feedback voltage FB and the reference voltage REF.

More specifically, the differential current signal IP behaves such that, when REF>FB, the larger the difference between the two voltages, the larger the differential current signal IP in the positive direction (the direction in which the current passes out of the error amplifier 140) and that, when REF<FB, the larger the difference between the two voltages, the larger the differential current signal IP in the negative direction (the direction in which the current passes into the error amplifier 140).

In contrast, contrary to the differential current signal IP, the differential current signal IN behaves such that, when REF>FB, the larger the difference between the two voltages, the larger the differential current signal IN in the negative direction and that, when REF<FB, the larger the difference between the two voltages, the larger the differential current signal IN in the positive direction.

The low-side current sensor 210 includes a switch 211 and a resistor 212, and senses the inductor current IL (hereinafter referred to as the low-side inductor current ILL) which passes through the synchronous rectification transistor 112 to acquire current feedback information Iinfo.

The first terminal of the switch 211 is connected to the drain of the synchronous rectification transistor 112 (that is, an application terminal for the switching voltage SW). The second terminal of the switch 211 is connected to the first terminal of the resistor 212. The second terminal of the resistor 212 is connected to the source (that is, an application terminal for the ground voltage PVSS) of the synchronous rectification transistor 112.

The switch 211 is, in accordance with the low-side gate signal G2, turned on and off along with the synchronous rectification transistor 112. More specifically, the switch 211 is on during the on-period of the synchronous rectification transistor 112 is on and is off during the off-period of the synchronous rectification transistor 112 is off.

Thus, during the on-period of the synchronous rectification transistor 112, as the current feedback information Iinfo mentioned previously, a low-side sense signal SNSL (=SW−PVSS=−ILL×RonL, where RonL is the on-resistance of the synchronous rectification transistor 112) which reflects the low-side inductor current ILL is transmitted to the information synthesizer 220. On the other hand, during the off-period of the synchronous rectification transistor 112, the low-side sense signal SNSL is fixed at a zero value via the resistor 212, and thus the high level of the switching voltage SW (≈PVDD) is not transmitted to the information synthesizer 220.

The low-side inductor current ILL can be sensed by any method other than one involving the sensing of the drain-source voltage of the synchronous rectification transistor 112. For example, the terminal-to-terminal voltage across a sense resistor that is connected in series with the synchronous rectification transistor 112 can be sensed, or the drain-source voltage of a transistor for current sensing that is connected in parallel with the synchronous rectification transistor 112 can be sensed.

The information synthesizer 220 includes resistors 221 and 222 (both with a resistance value R), and generates synthesized feedback information Vlinfo by combining the voltage feedback information Vinfo acquired by the error amplifier 140 with the current feedback information Iinfo acquired by the low-side current sensor 210.

The first terminal of the resistor 221 is connected to the first output terminal of the error amplifier 140 (that is, an output terminal for the differential current signal IP). The second terminal of the resistor 221 is connected to the first output terminal for the low-side current sensor 210 (that is, an output terminal for the low-side sense signal SNSL).

The first terminal of the resistor 222 is connected to the second output terminal of the error amplifier 140 (that is, an output terminal for the current signal IN). The second terminal of the resistor 222 is connected to the second output terminal of the low-side current sensor 210 (that is, an application terminal for the ground voltage PVSS).

Here, the positive-side differential error signal (a voltage signal) which is output from the first terminal of the resistor 221 can be given by the formula ERRP=IP×R+SW. The negative-side differential error signal (a voltage signal) which is output from the first terminal of the resistor 222 can be given by the formula ERRN=IN×R+PVSS (where IN=−IP).

Thus, the differential signal between the differential error signals ERRP and ERRN can be expressed by the formula ERRP−ERRN=2IP×R−ILL×RonL. Here, the first term on the right side (2IP×R) can be understood as the voltage feedback information Vinfo that is acquired by the error amplifier 140. Likewise, the second term on the right side (−ILL×RonL) can be understood as the current feedback information Iinfo that is acquired by the low-side current sensor 210. Thus, the differential signal mentioned above (ERRP−ERRN) can be understood as the synthesized feedback information Vlinfo resulting from combining the voltage feedback information Vinfo with the current feedback information Iinfo.

The information holder 230 receives differential input of the synthesized feedback information Vlinfo, and includes a pair of sample and hold circuits 231 and 232 for sampling, during the on-period of the synchronous rectification transistor 112, the low-side peak value of the inductor current IL and for holding and outputting, during the on-period of the output transistor 111, differential hold signals HLDP and HLDN.

The sample and hold circuit 231 samples the differential error signal ERRP in accordance with the sample and hold control signal HOLD from the control circuit 180 during the on-period of the synchronous rectification transistor 112, and holds and outputs the differential hold signal HLDP during the on-period of the output transistor 111.

The sample and hold circuit 232 samples the differential error signal ERRN in accordance with the sample and hold control signal HOLD from the control circuit 180 during the on-period of the synchronous rectification transistor 112, and holds and outputs the differential hold signal HLDN during the on-period of the output transistor 111.

The PWM comparator 170, during the on-period of the output transistor 111, compares the ramp signal RAMP, which is fed to the inverting input terminal (−) of the PWM comparator 170 (more precisely, the differential hold signal HLDN with the ramp signal RAMP added to it), with the differential hold signal HLDP, which is fed to the non-inverting input terminal (+) of the PWM comparator 170, to generate an off signal OFF, and thereby determines the turn-off time point of the output transistor 111.

With the switching power supply 100 according to this embodiment, it is possible to achieve output feedback control of the current mode control type, and thus it is possible to enhance the load response of the output voltage VOUT.

In particular, with a configuration that senses, instead of the inductor current IL passing through the output transistor 111 (hereinafter, referred to as the high-side inductor current ILH), the low-side inductor current ILL passing through the synchronous rectification transistor 112, even when the on-period of the output transistor 111 is short (for example, under high-voltage input or low-voltage output), it is possible to perform output feedback control of the current mode control type with no trouble.

For output feedback control of the current mode control type using the current feedback information Iinfo reflecting the low-side inductor current ILL, the information holder 230 (sample and hold circuits 231 and 232) is needed to hold the current feedback information Iinfo acquired during the on-period of the synchronous rectification transistor 112 (that is, during the off-period of the output transistor 111).

Here, the information holder 230 is provided between the information synthesizer 220 and the PWM comparator 170 and holds the synthesized feedback information Vlinfo that results from combining the voltage feedback information Vinfo with the current feedback information Iinfo.

With this configuration, hold-and-output period of the information holder 230, even when noise is introduced in the stage preceding the information holder 230, it has no effect on signal comparison in the PWM comparator 170. This permits stable duty cycle control.

In addition, by adding up the voltage feedback information Vinfo to the current feedback information Iinfo and then sampling and holding the result, it is possible to prevent time-related discrepancy between the voltage feedback information Vinfo and the current feedback information Iinfo and thereby to improve the performance of the switching power supply 100.

Second Embodiment

Figure 3:
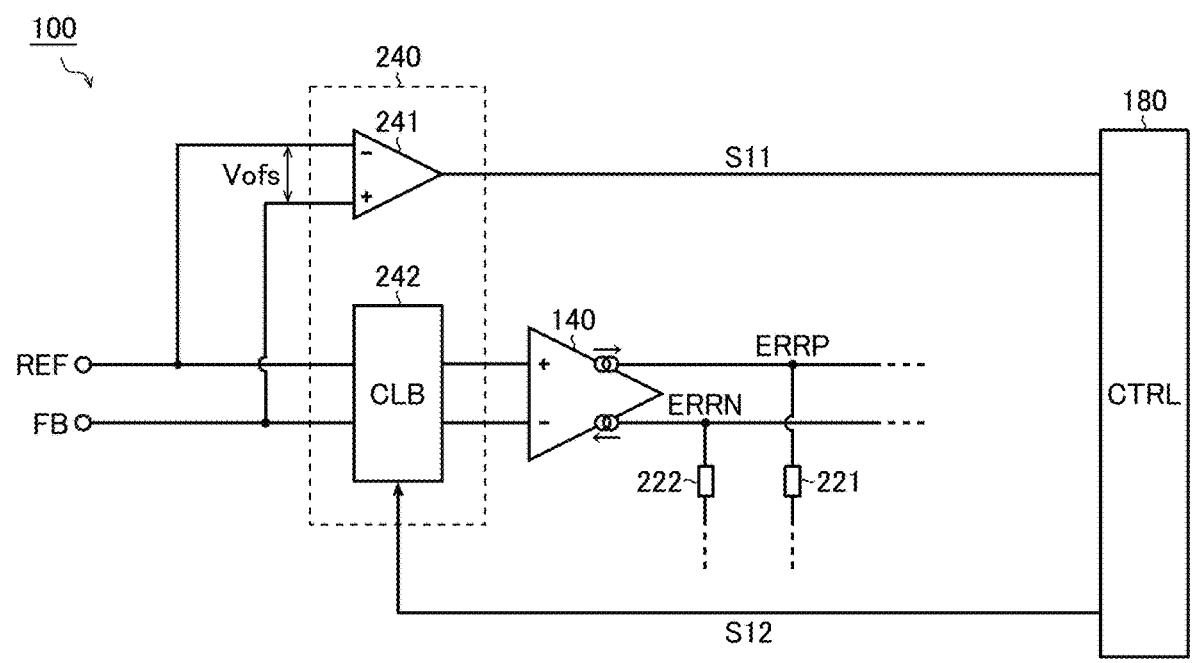
FIG. 3 is a diagram showing a switching power supply according to a second embodiment.

FIG. 3 is a diagram showing a switching power supply 100 according to a second embodiment. The switching power supply 100 according to this embodiment, while being based on the basic configuration (FIG. 1) or the first embodiment (FIG. 2) described previously, further includes an error corrector 240 that detects an input error Vofs (=FB−REF) in the error amplifier 140, which includes no integrator element (except a parasitic element), to correct the input signals to the error amplifier 140 (that is, at least one of the feedback voltage FB and the reference voltage REF). The error corrector 240 includes a comparator 241 and a digital calibrator 242.

The comparator 241 is a means for detecting an input error Vofs (=FB−REF) in the error amplifier 140. The comparator 241 compares the feedback voltage FB, which is fed to the non-inverting input terminal (+) of the error amplifier 140, with the reference voltage REF, which is fed to the inverting input terminal (−) of the error amplifier 140, to generate an input error detection signal S11. The input error detection signal S11 is at high level when FB>REF (Vofs>0), and is at low level when FB<REF (Vofs<0).

The control circuit 180, based on the input error detection signal S11, generates a digital calibration signal S12 so as to reduce the input error Vofs. For example, when the input error detection signal S11 is at high level, the digital calibration signal S12 can be generated so that the feedback voltage FB is lowered or/and the reference voltage REF is raised. By contrast, when the input error detection signal S11 is at low level, the digital calibration signal S12 can be generated so that the feedback voltage FB is raised or/and the reference voltage REF is lowered.

The digital calibrator 242, in accordance with the digital calibration signal S12, corrects at least one of the feedback voltage FB and the reference voltage REF. Suitably used as the digital calibrator 242 is, for example, a DAC. A configuration is also possible where the input error detection signal S11 is fed directly to the digital calibrator 242 and the digital calibration signal S12 is generated inside it. In this case, correction of the input error Vofs can be completed with the error corrector 240 alone, without requiring the control circuit 180.

Next, the significance of introducing the error corrector 240 will be described in detail.

A common error amplifier has, as an integrator element, a capacitor (of, for example, several tens of picofarads) for phase compensation and generates an error signal by charging and discharging the capacitor. This helps reduce the likelihood of oscillation but results in a limited signal bandwidth, making such an error amplifier unsuitable for achieving a high-speed voltage feedback control loop. On the other hand, eliminating an integrator element from an error amplifier helps achieve a high-speed voltage feedback control loop but, as a trade-off, makes it difficult to cancel out an input error in the error amplifier.

As a solution, the switching power supply 100 according to this embodiment, while accelerating the voltage feedback control loop (from several tens of kilohertz to several megahertz) by using an error amplifier 140 which includes no integrator element, employs, separately from the error amplifier 140, an error corrector 240 for correcting an input error Vofs in the error amplifier 140.

Parallelizing high-speed voltage feedback and error correction in that way helps separate the design parameters for them, and this helps achieve a high-speed and simultaneously accurate voltage feedback control loop. Unlike common error amplifiers, no capacitor for phase compensation is required, and thus it is also possible to reduce the area of the chip and the number of pins.

Third Embodiment

Figure 4:
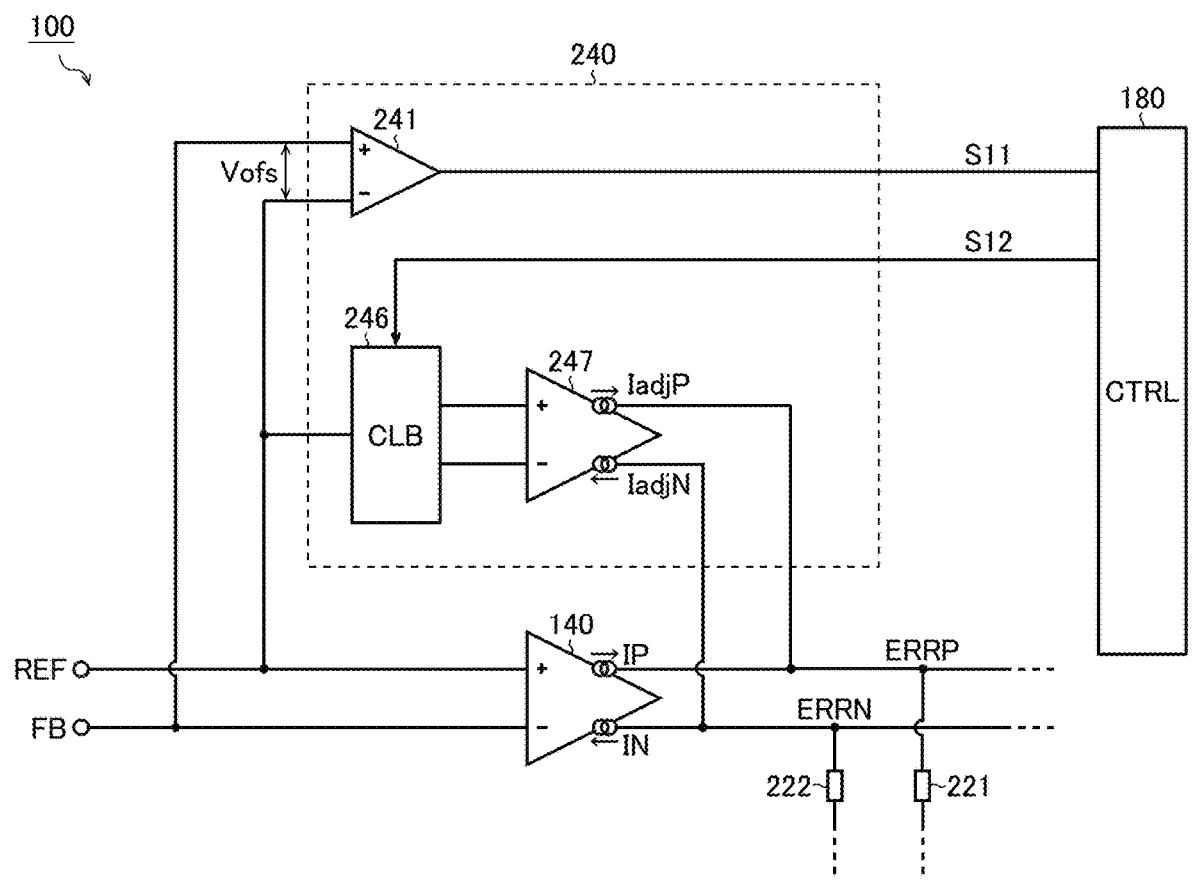
FIG. 4 is a diagram showing a switching power supply according to a third embodiment.

FIG. 4 is a diagram showing a switching power supply 100 according to a third embodiment. The switching power supply 100 according to this embodiment, like that of the second embodiment (FIG. 3) described previously, includes an error corrector 240, which here has a different circuit configuration.

More specifically, the error corrector 240 in this embodiment includes, in addition to the comparator 241 mentioned previously, a digital calibrator 246 and an error correction amplifier 247. The error corrector 240 detects an input error Vofs in the error amplifier 140 and corrects the output signals (error signals ERRP and ERRN) from the error amplifier 140.

The digital calibrator 246 (for example, DAC), in accordance with the digital calibration signal S12, generates from the reference voltage REF a differential input signal to the error correction amplifier 247.

The error correction amplifier 247 generates correction currents IadjP and IadjN in accordance with the differential input signal from the digital calibrator 246 and adds the correction currents IadjP and IadjN respectively to the differential current signals IP and IN from the error amplifier 140.

Here, the error amplifier 140 has a role as an AC path (high-speed path) that transmits the change in the output voltage VOUT at high speed. Thus, the error amplifier 140 is designed to be capacitorless and with a focus on speed. More specifically, the error amplifier 140 can be said to be faster than the error correction amplifier 247.

On the other hand, the digital calibrator 246 and the error correction amplifier 247 have a role as a DC path (low-speed path) that determines the accuracy of the output voltage VOUT. Thus, the error correction amplifier 247, along with the digital calibrator 246 in the stage preceding it, is designed with a focus on power saving and accuracy. More specifically, the error correction amplifier 247 can be said to be more accurate than the error amplifier 140.

In this way, also with a configuration where, not the input signals to the error amplifier 140 but the output signals from the error amplifier 140 is corrected, it is possible to achieve a high-speed and simultaneously accurate voltage feedback control loop.

Fourth Embodiment

Figure 5:
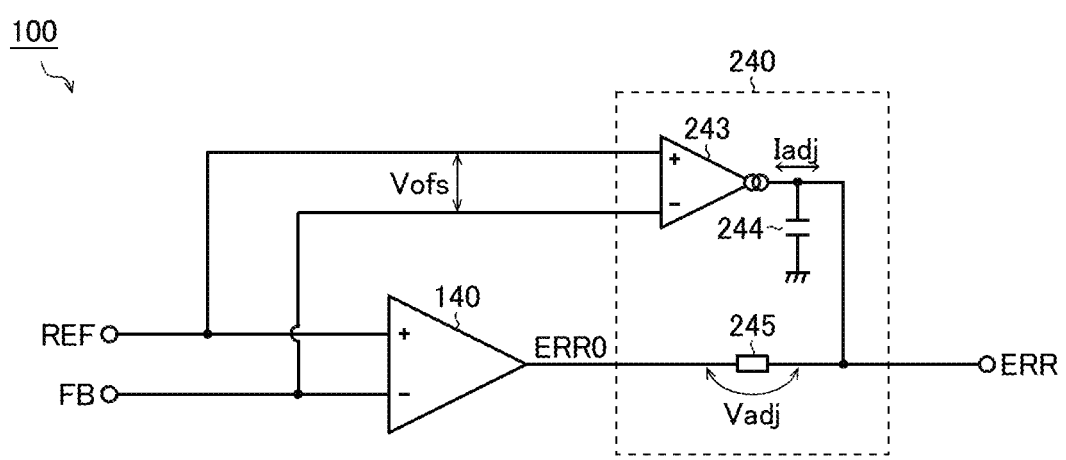
FIG. 5 is a diagram showing a switching power supply according to a fourth embodiment.

FIG. 5 is a diagram showing a switching power supply 100 according to a fourth embodiment. The switching power supply 100 according to this embodiment, like those of the second and third embodiments (FIGS. 3 and 4) described previously, includes an error corrector 240, which here has a different circuit configuration.

More specifically, the error corrector 240 in this embodiment includes an error correction amplifier 243, a capacitor 244, and a resistor 245. The error corrector 240 detects an input error Vofs in the error amplifier 140 to generate a correction current Iadj (corresponding to a first error signal) and, using the correction current Iadj, corrects the error signal ERR0 (corresponding to a second error signal) from the error amplifier 140.

In this embodiment, for the sake of simple description, an error amplifier 140 of a single output type is taken as an example. Instead, as in the second and third embodiments (FIGS. 3 and 4) described previously, the error amplifier 140 may be of a differential output type.

The error correction amplifier 243 generates the correction current Iadj commensurate with the difference (that is, the input error Vofs) between the feedback voltage FB, which is fed to the inverting input terminal (−) of the error correction amplifier 243, and the reference voltage REF, which is fed to the non-inverting input terminal (+) of the error correction amplifier 243. When FB<REF (that is, Vofs>0), the larger the difference between the two voltages, the larger the correction current Iadj in the positive direction (that is, the direction leading from the output terminal of the error correction amplifier 243 via the resistor 245 to the output terminal of the error amplifier 140). On the other hand, when FB>REF (that is, Vofs<0), the larger the difference between the two voltages, the larger the correction current Iadj in the negative direction (that is, the direction leading from the output terminal of the error amplifier 140 via the resistor 245 to the output terminal of the error correction amplifier 243 via the resistor 245).

Here, the error correction amplifier 243 is connected in parallel with the error amplifier 140 solely as a means for correcting the input error Vofs, and the current capacity of the error correction amplifier 243 is kept sufficiently lower (to, for example, several microamperes) than that of the error amplifier 140. To the output terminal of the error correction amplifier 243, a capacitor 244 of a low capacitance (for example, several picofarads) is connected. That is, the error correction amplifier 243 is an amplifier of a current output type incorporating an integrator element, with a processing speed slower than that of the error amplifier 140.

The resistor 245 (with a resistance value Radj) is connected between the output terminal of the error amplifier 140 and the output terminal of the error correction amplifier 243 and serves as an adder that adds the terminal-to-terminal voltage across the resistor 245, as a correction voltage Vadj (=Iadj×Radj), to the error signal ERR to generate a corrected error signal ERR (=ERR0+Vadj).

For example, when FB<REF, the correction current Iadj passes in the positive direction, and thus the error signal ERR0 is raised by the correction voltage Vadj. As a result, the off-timing of the output transistor 111 delays by the period commensurate with the rise of the corrected error signal ERR, and thus the output voltage VOUT (and hence the feedback voltage FB) rises to reduce the input error Vofs.

On the other hand, when FB>REF, the correction current Iadj passes in the negative direction, and thus the error signal ERR0 is lowered by the correction voltage Vadj. As a result, the off-timing of the output transistor 111 advances by the period commensurate with the fall of the corrected error signal ERR, and thus the output voltage VOUT (and hence the feedback voltage FB) falls to reduce the input error Vofs.

In this way, by connecting the error correction amplifier 243 that is low-speed and accurate in parallel with the error amplifier 140, as with the second and the third embodiments described previously, it is possible to achieve a high-speed and simultaneously accurate voltage feedback control loop.

Fifth Embodiment

Figure 6:
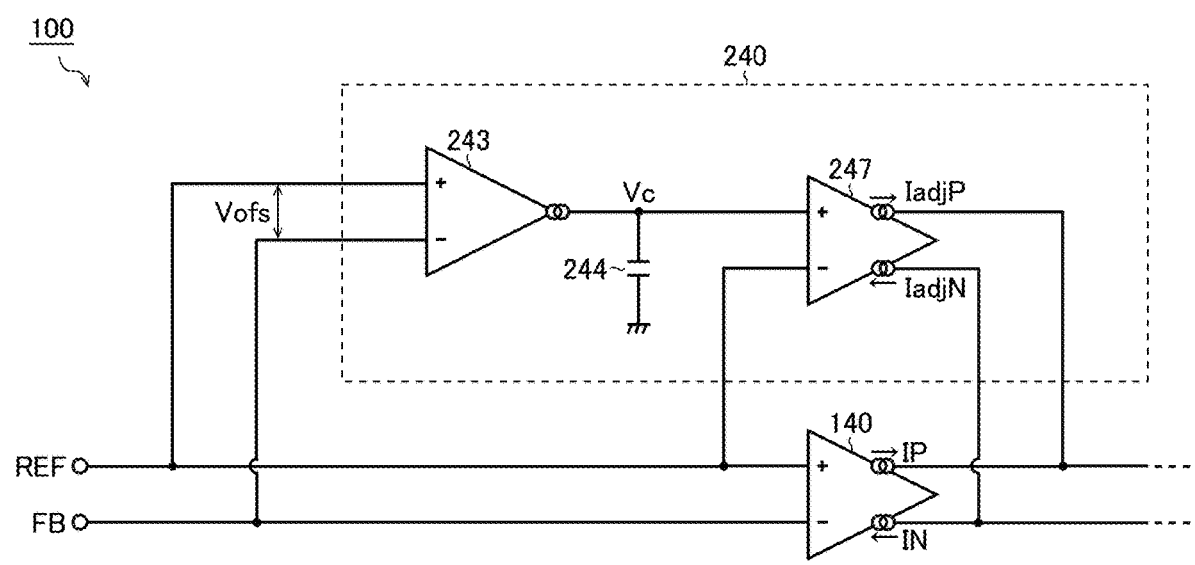
FIG. 6 is a diagram showing a switching power supply according to a fifth embodiment.

FIG. 6 is a diagram showing a switching power supply 100 according to a fifth embodiment. The switching power supply 100 according to this embodiment, like those of the second, third, and fourth embodiments (FIGS. 3, 4, and 5) described previously, includes an error corrector 240, which here has a different circuit configuration.

More specifically, the error corrector 240 according to this embodiment, while being based on the third embodiment (FIG. 4) described previously, includes, instead of the comparator 241 and the digital calibrator 246, the error correction amplifier 243 and the capacitor 244 in the fourth embodiment (FIG. 5).

The error correction amplifier 243 is a current-output amplifier having, at its output terminal, the capacitor 244 of a low capacitance (for example, several picofarads) connected to. An error voltage Vc that is charged to the capacitor 244 rises when FB<REF (Vofs>0), and falls when FB>REF (Vofs<0). Thus, the error correction amplifier 243 and the capacitor 244 correspond to an integrator that integrates an input error Vofs to generate an error voltage Vc.

The error correction amplifier 247 generates the correction currents IadjP and IadjN commensurate with the difference value between the error voltage Vc, which is fed to the non-inverting input terminal (+) of the error correction amplifier 247, and the reference voltage REF, which is fed to the inverting input terminal (−) of the error correction amplifier 247, and adds the correction currents IadjP and IadjN respectively to the differential current signals IP and IN from the error amplifier 140.

Here, as mentioned previously, the error amplifier 140 has a role as an AC path (high-speed path) that transmits the change in the output voltage VOUT at high speed. Thus, the error amplifier 140 is designed to be capacitorless and with a focus on speed. More specifically, the error amplifier 140 can be said to be faster than the error correction amplifier 247.

On the other hand, the error correction amplifier 247 and the integrator (that is, the error correction amplifier 243 and the capacitor 244) which is connected in the stage preceding it have a role as a DC path (low-speed path) that determines the accuracy of the output voltage VOUT. Thus, the error correction amplifier 247, along with the integrator in the stage preceding it, is designed with a focus on power saving and accuracy. More specifically, the error correction amplifier 247 can be said to be more accurate than the error amplifier 140.

With this configuration, as with the second, third, and fourth embodiments described previously, it is possible to achieve a high-speed and simultaneously accurate voltage feedback control loop.

In particular, when a light load mode (a power saving mode with reduced electric power consumption achieved by, under a light load, suspending the switching operation) is implemented in the switching power supply 100, it is important to enhance the transient response characteristics during recovery from the light load mode by achieving high-speed output feedback control using the error amplifier 140 that includes no integrator element.

However, the switching power supply 100 according to this embodiment, in the light load mode in which the switching operation is suspended, cannot hold the error voltage Vc in the integrator. This may lead to malfunctioning of the error correction amplifier 247 during recovery from the light load mode.

To avoid such an inconvenience, for example, a clamper (not shown) may be provided, in a stage succeeding the integrator, that limits the error voltage Vc so that it will not fall below a predetermined lower limit value even in the light load mode. Or, needless to say, it is possible, as in the second embodiment (FIG. 3) or the third embodiment (FIG. 4) described previously, to hold voltage information using the digital calibrator 246.

<Achieving High Speed and Enhanced Accuracy Simultaneously>

Figure 7:
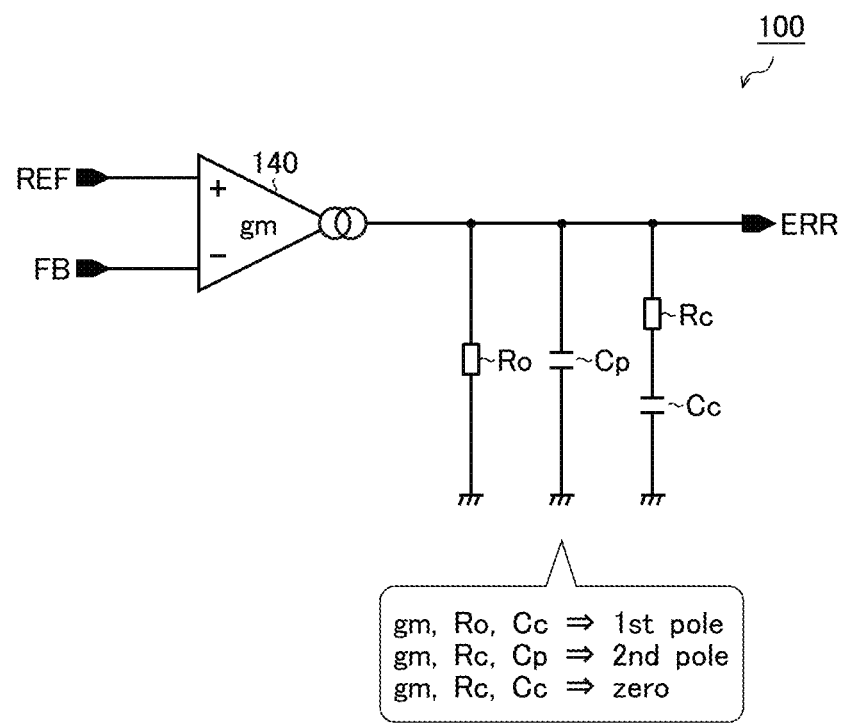
FIG. 7 is a diagram illustrating a reason why it is difficult to achieve high speed and enhanced accuracy simultaneously with a single error amplifier.

FIG. 7 is a diagram illustrating a reason why it is difficult to achieve high speed and enhanced accuracy simultaneously with a single error amplifier 140. In the following description, it is assumed that the transconductance of the error amplifier 140 is gm.

As shown in FIG. 7, in general, the output terminal of the error amplifier 140 is connected to a resistor etc. Rc and Cc for phase compensation and in addition is accompanied by a resistor Ro or a capacitor Cp as a parasitic element. Thus, for example, in a case where the transfer function of the error amplifier 140 has two poles (a first pole and a second pole) and one zero point, the first pole is determined by gm, Ro, and Cc, a second pole by gm, Rc, and Cp, and the zero point by gm, Rc, and Cc.

Thus, the relationships among the two poles and one zero point are not independent of each other. In the semiconductor integrated circuit device 200, there are restrictions on the set values of the internal parameters (gm, Rc, Cc, etc.). Thus, it is difficult to set the two poles and one zero point as aimed at using a single error amplifier 140.

For example, increasing the device size of the error amplifier 140 with a view to improving the accuracy of the error amplifier 140 leads to an increased size of the parasitic capacitor Cp, and this results in slower response speed of the error amplifier 140. On the other hand, to enhance the response speed of the error amplifier 140 requires reducing the device size of the error amplifier 140 so as to minimize the parasitic capacitor Cp accompanying it, and this sacrifices the accuracy of the error amplifier 140.

In view of what has been discussed above, the following description proposes an output feedback control circuit that can achieve high speed and enhanced accuracy simultaneously.

Sixth Embodiment

Figure 8:
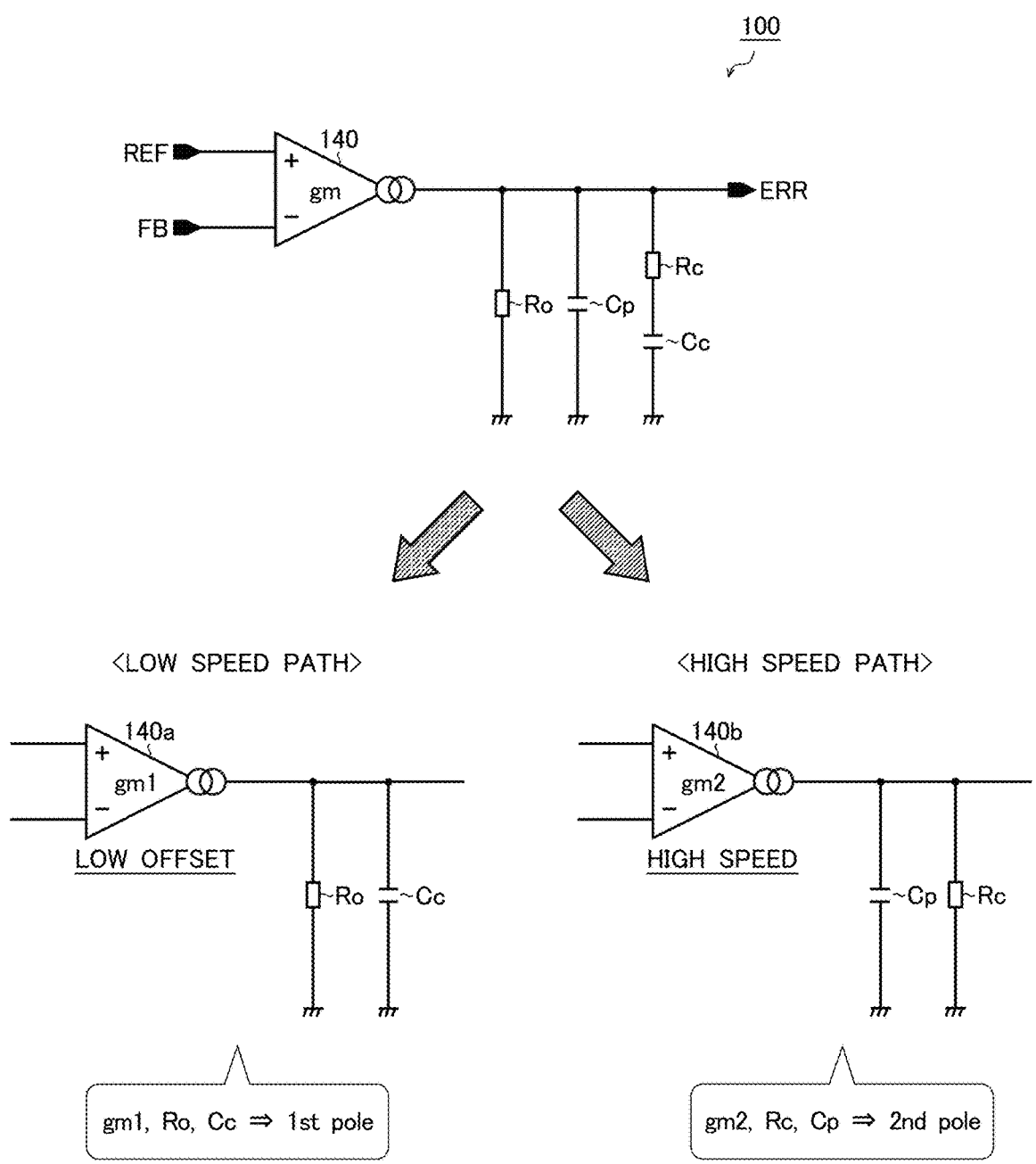
FIG. 8 is a diagram showing a switching power supply according to a sixth embodiment.

FIG. 8 is a diagram showing a switching power supply 100 according to a sixth embodiment. The switching power supply 100 according to this embodiment includes, as a component of the output feedback control circuit, instead of a single error amplifier 140, a first signal processor (for example, an error amplifier 140a) that forms a first path (DC path/low-speed path) and a second signal processor (for example, an error amplifier 140b) that forms a second path (AC path/high-speed path). That is, in the switching power supply 100 according to this embodiment, the error amplifier 140 described previously is separated into two. In the following description, it is assumed that the transconductances of the error amplifiers 140a and 140b are gm1 and gm2 (where gm1≠gm2) respectively.

The error amplifier 140a has a role as a DC path (low-speed path) that determines the accuracy of the output voltage VOUT. Accordingly, the error amplifier 140a is designed with a focus on power saving and accuracy (high gain and low offset). More specifically, the error amplifier 140a can be said to be more accurate than the error amplifier 140b.

To the output terminal of the error amplifier 140a, the capacitor Cc for phase compensation is connected. Thus, if Cc>>Cp, the parasitic capacitor Cp can be ignored. The output terminal of the error amplifier 140a is accompanied by the resistor Ro as a parasitic element. As a result, the first pole is determined by gm1, Ro, and Cc.

By contrast, the error amplifier 140b has a role as an AC path (high-speed path) that transmits the change in the output voltage VOUT at high speed. Accordingly, the error amplifier 140b is designed to be capacitorless and with a focus on speed. More specifically, the error amplifier 140b can be said to be faster than the error amplifier 140a.

To the output terminal of the error amplifier 140b, the resistor Rc for phase compensation is connected. Thus, if Rc<<Ro, the parasitic resistor Ro can be ignored. The output terminal of the error amplifier 140a is accompanied by the capacitor Cp as a parasitic element. To put otherwise, to the output terminal of the error amplifier 140b, no capacitor (for example, like the capacitor Cc for phase compensation) other than the parasitic element is connected. Thus, the error amplifier 140b includes no integrator element. Thus, the second pole is determined by gm2, Rc, and Cp.

In this way, separately providing an error amplifier 140a that forms a low-speed path and an error amplifier 140b that forms a high-speed path makes it possible to set their respective transconductances gm1 and gm2 at any values independently of each other. As a result, the adjustable range of the transfer function expands, and it is thus possible to achieve a high-speed and simultaneously accurate voltage feedback control loop.

Figure 9:
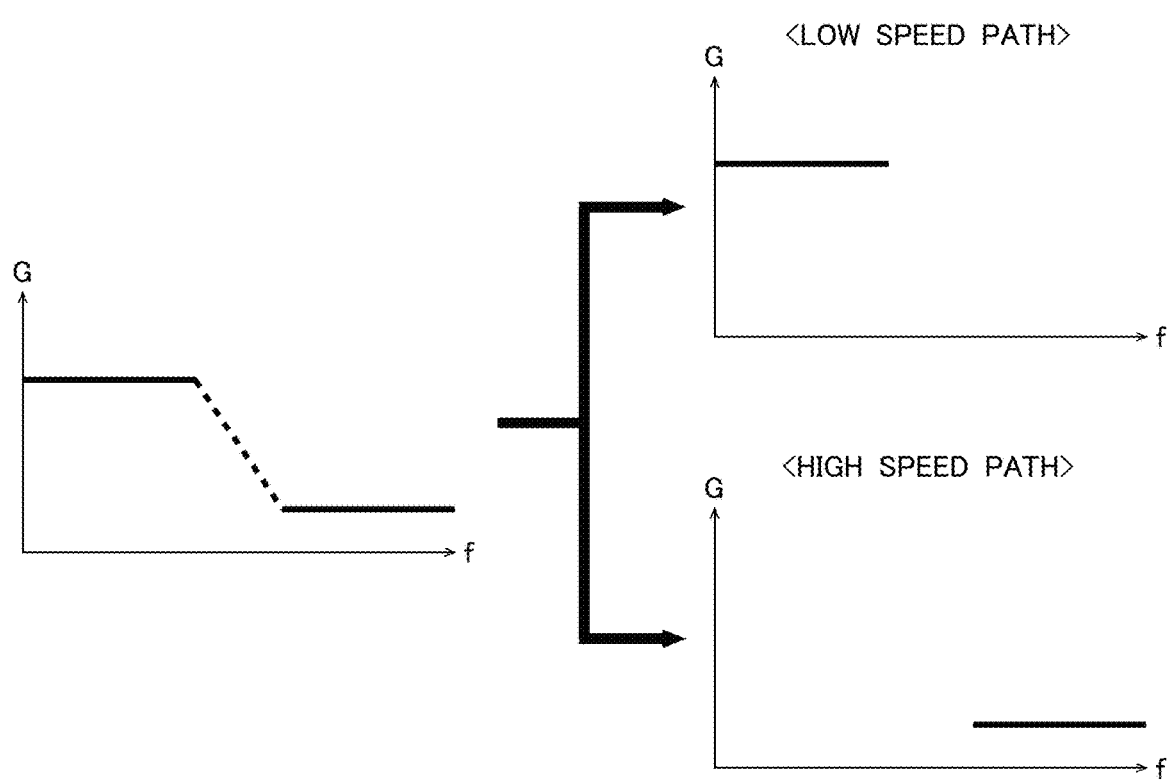
FIG. 9 is a diagram showing frequency-gain characteristics in the sixth embodiment.

FIG. 9 is a diagram showing frequency-gain characteristics in the sixth embodiment. As shown in FIG. 9, the low-frequency gain can be determined using the error amplifier 140a that forms the low-speed path. For example, to raise the low-frequency gain, the transconductance gm1 can be reduced or the capacitance value of the capacitor Cc can be increased.

By contrast, the high-frequency gain can be determined using the error amplifier 140b that forms the high-speed path. For example, to raise the high-frequency gain, the transconductance gm2 can be increased or the capacitance value of the capacitor Rc can be increased.

Seventh Embodiment

Figure 10:
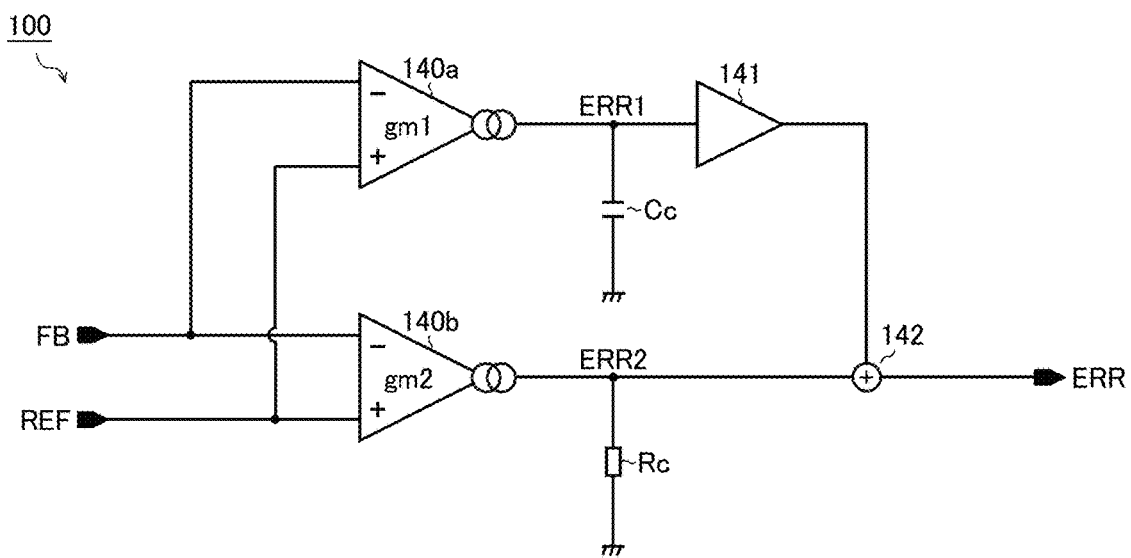
FIG. 10 is a diagram showing a switching power supply according to a seventh embodiment.

FIG. 10 is a diagram showing a switching power supply 100 according to a seventh embodiment. The switching power supply 100 of this embodiment, while being based on the sixth embodiment (FIG. 8) described previously, includes a buffer 141 and a calculator 142 (in the example in FIG. 10, an adder) in addition to the error amplifiers 140a and 140b, and the resistor Rc and a capacitor Cc for phase compensation.

The error amplifier 140a outputs an error signal ERR1 that is commensurate with the difference between the feedback voltage FB, which is fed to the inverting input terminal (−) of the error amplifier 140a, and the reference voltage REF, which is fed to the non-inverting input terminal (+) of the error amplifier 140a. As in the third embodiment (FIG. 4) described previously, to the input terminal of the error amplifier 140a, the digital calibrator 246 that corrects the input error Vofs may be connected. In that case, the capacitor Cc may be omitted.

The error amplifier 140b outputs an error signal ERR2 that is commensurate with the difference between the feedback voltage FB, which is fed to the inverting input terminal (−) of the error amplifier 140b, and the reference voltage REF, which is fed to the non-inverting input terminal (+) of the error amplifier 140b.

The buffer 141 is provided between the output terminal of the error amplifier 140a and the calculator 142 and outputs the error signal ERR1 generated in the error amplifier 140a to the calculator 142.

The calculator 142 adds the error signals ERR1 and ERR2 together to generate the error signal ERR and outputs it to the PWM comparator 170 (not shown) in a stage succeeding the calculator 142.

In this way, by separately providing the error amplifier 140a that forms a low-speed path and the error amplifier 140b that forms a high-speed path and performing addition/subtraction between the error signals ERR1 and ERR2 that are generated in the error amplifiers 140a and 140b respectively, it is possible to achieve a high-speed and simultaneously accurate voltage feedback control loop.

Eighth Embodiment

Figure 11:
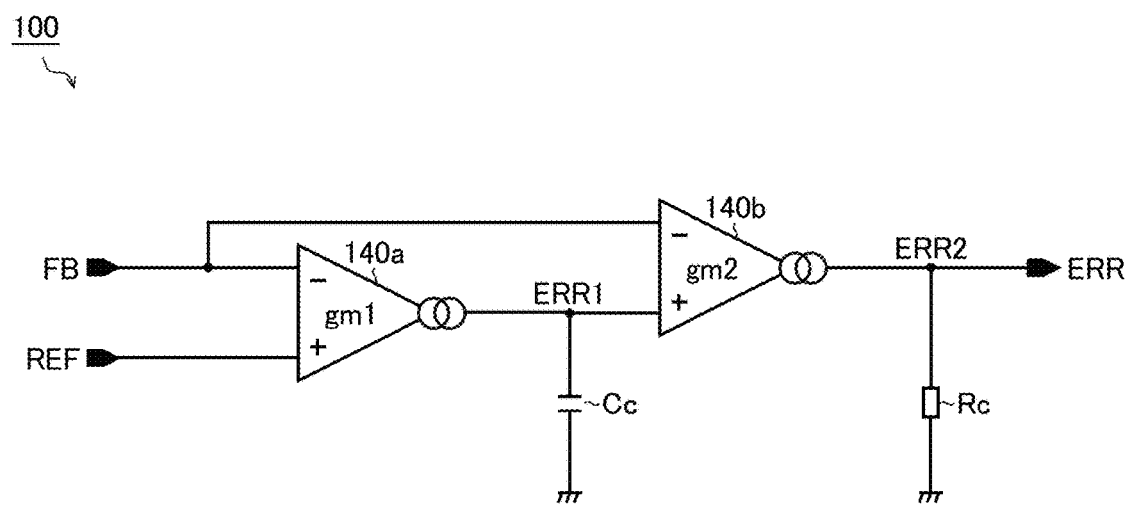
FIG. 11 is a diagram showing a switching power supply according to an eighth embodiment.

FIG. 11 is a diagram showing a switching power supply 100 according to an eighth embodiment. The switching power supply 100 according to this embodiment, while being based on the sixth embodiment (FIG. 8) described previously, much ingenuity has been exercised in the interconnection between the error amplifiers 140a and 140b.

The error amplifier 140a outputs an error signal ERR1 that is commensurate with the difference between the feedback voltage FB, which is fed to the inverting input terminal (−) of the error amplifier 140a, and the reference voltage REF, which is fed to the non-inverting input terminal (+) of the error amplifier 140a. As in the third embodiment (FIG. 4) described previously, to the input terminal of the error amplifier 140a, the digital calibrator 246 that corrects the input error Vofs may be connected. In that case, the capacitor Cc may be omitted.

The error amplifier 140b generates the error signal ERR2 that is commensurate with the difference between the feedback voltage FB, which is fed to the inverting input terminal (−) of the error amplifier 140b, and the error signal ERR1, which is fed to the non-inverting input terminal (+) of the error amplifier 140b, and outputs, as the error signal ERR, the error signal ERR2 to the PWM comparator 170 (not shown) in a stage succeeding the error amplifier 140b.

With the switching power supply 100 according to this embodiment, unlike the seventh embodiment (FIG. 10) described previously, it is possible to achieve a high-speed and simultaneously accurate voltage feedback control loop without requiring the buffer 141 and the calculator 142.

Although not specifically illustrated, reversing the input terminals for the feedback voltage FB and the reference voltage REF and in addition reversing the positive and negative input polarities of the error amplifier 140b will give effects similar to those mentioned above.

Ninth Embodiment

Figure 12:
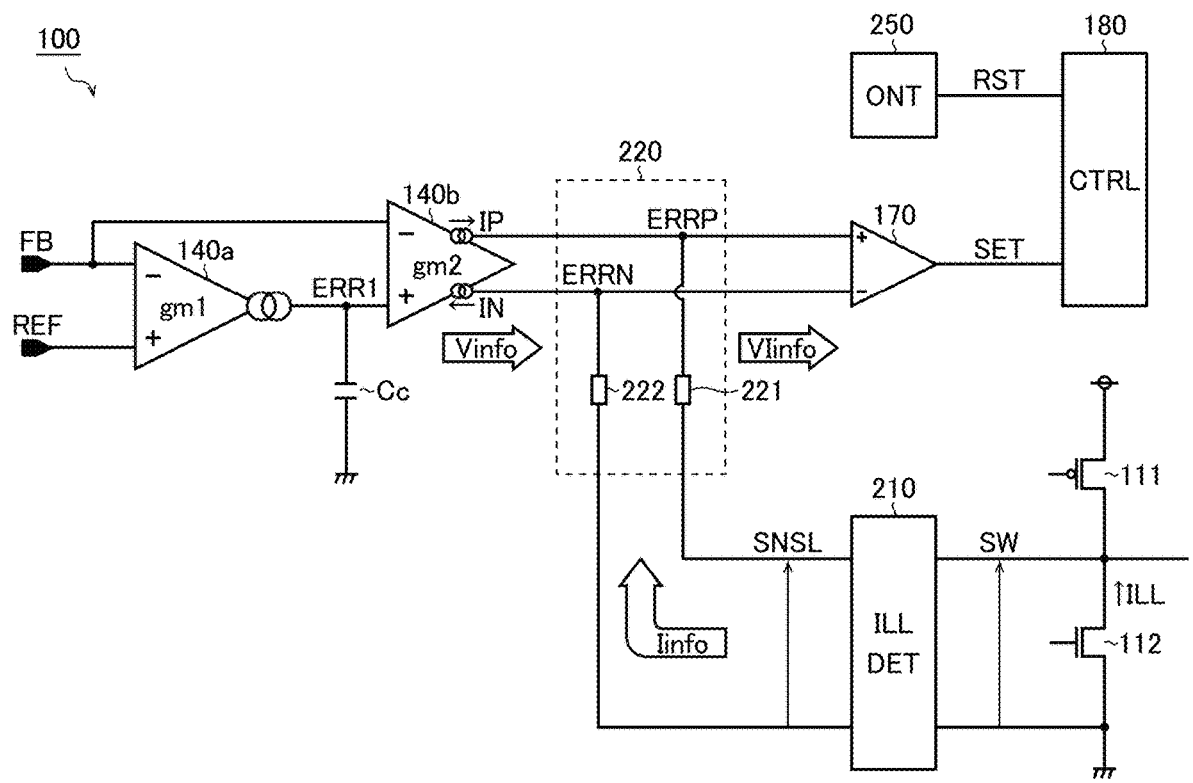
FIG. 12 is a diagram showing a switching power supply according to a ninth embodiment.

FIG. 12 is a diagram showing a switching power supply 100 according to a ninth embodiment. The switching power supply 100 according to this embodiment, while being based on the eighth embodiment (FIG. 11) described previously, includes, as components in a stage succeeding the error amplifier 140b, the switching output circuit 110, the PWM comparator 170, the control circuit 180, the low-side current sensor 210, the information synthesizer 220, and an on-time setter 250. Such components as have already been mentioned are basically identified by the same reference signs as in FIGS. 1 and 2, and no overlapping description will be repeated. The following description focuses on the features unique to this embodiment.

The low-side current sensor 210 detects a low-side inductor current ILL that passes through the synchronous rectification transistor 112 to acquire current feedback information Iinfo.

The information synthesizer 220 combines the voltage feedback information Vinfo fed from the error amplifier 140b with the current feedback information Iinfo acquired by the low-side current sensor 210 to generate synthesized feedback information Vlinfo (that is, the positive-side error signal ERRP and the negative-side error signal ERRN).

The PWM comparator 170 compares the positive-side error signal ERRP, which is fed to the non-inverting input terminal (+) of the PWM comparator 170, with the negative-side error signal ERRN, which is fed to the inverting input terminal (−) of the PWM comparator 170 and generates a set signal SET.

The on-time setter 250 generates a pulse in a reset signal RST when a predetermined on-time has passed after generation of a pulse in the set signal SET.

The control circuit 180 generates the high-side control signal S1 and the low-side control signal S2 such that the switching voltage SW is set to high level when a pulse is generated in the set signal SET and the switching voltage SW is reset to low level when a pulse is generated in the reset signal RST.

With the switching power supply 100 of this embodiment, it is possible, using the output feedback control circuit including the error amplifiers 140a and 140b, to drive the switching output circuit 110 by fixed on-time operation so as to reduce the error signal ERR (=ERRP−ERRN).

In particular, by performing output feedback control using not only voltage feedback information Vinfo but also current feedback information Iinfo, even when the ripple component on the feedback voltage FB is small (for example, in a case where a ceramic capacitor with a low ESR (equivalent series resistance) is used as the capacitor 114), it is possible to achieve stable output feedback control.

<Combining the Embodiments>

The various embodiments described thus far can be combined freely unless inconsistent.

For example, it is possible to perform the fixed on-time output feedback control described as an example in the ninth embodiment (FIG. 12) using the error signal ERR generated in the second embodiment (FIG. 3), the third embodiment (FIG. 4), the fourth embodiment (FIG. 5), the fifth embodiment (FIG. 6), the sixth embodiment (FIG. 8), or the seventh embodiment (FIG. 10).

<Applications>

Figure 13:
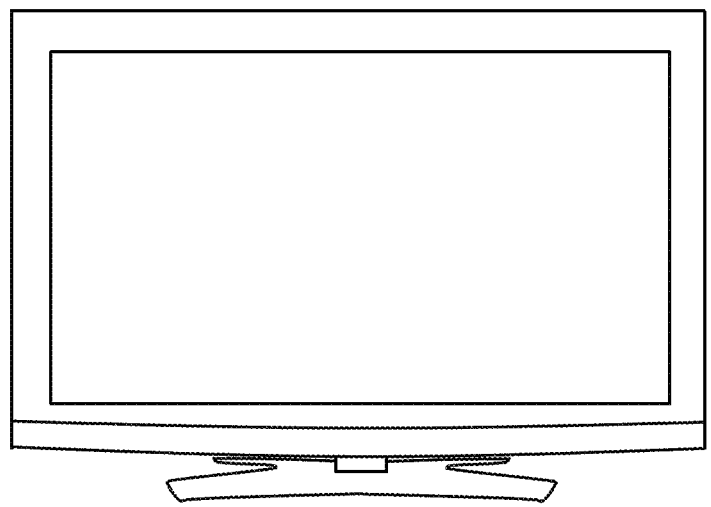
FIG. 13 is an exterior view of a television receiver.
Figure 14:
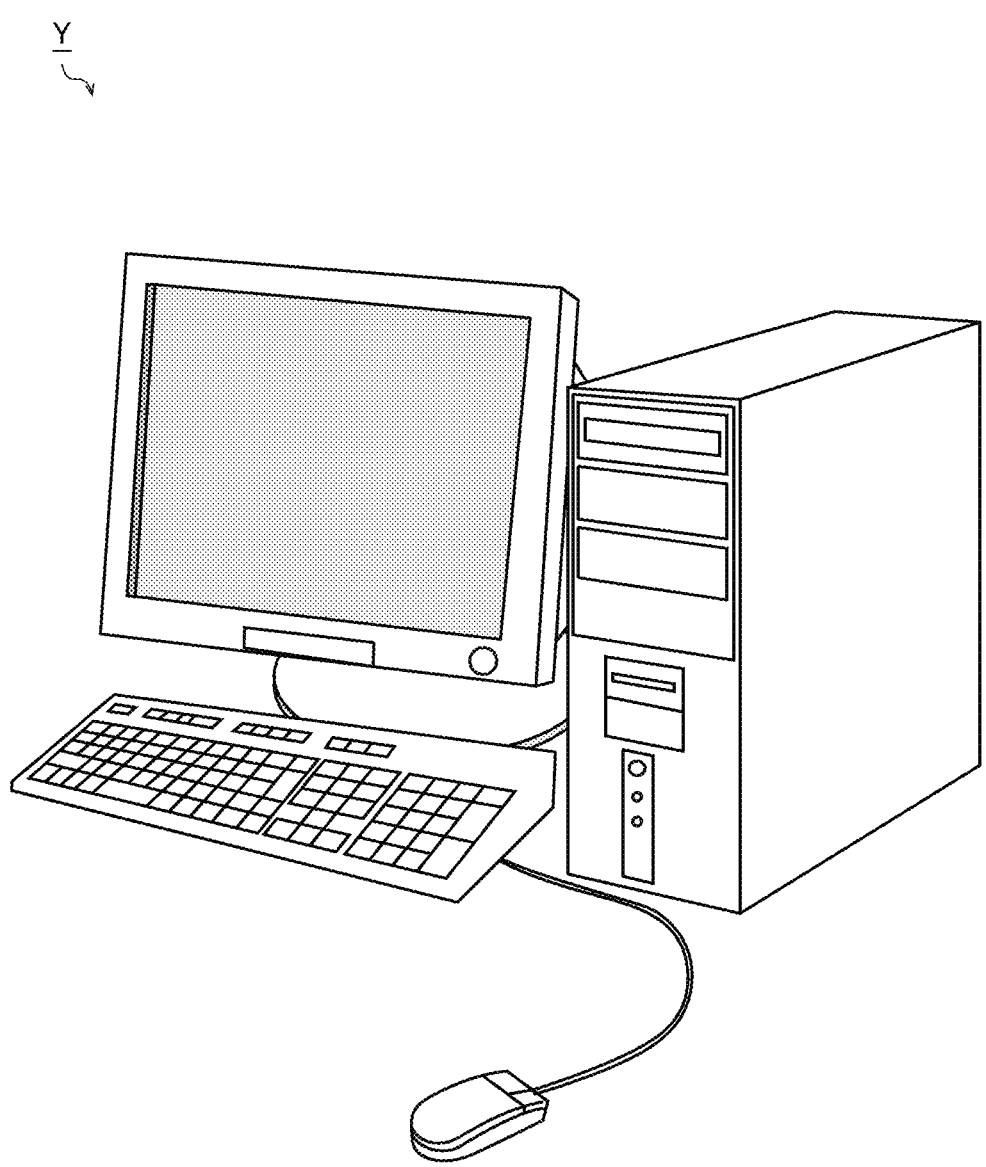
FIG. 14 is an exterior view of a personal computer.
Figure 15:
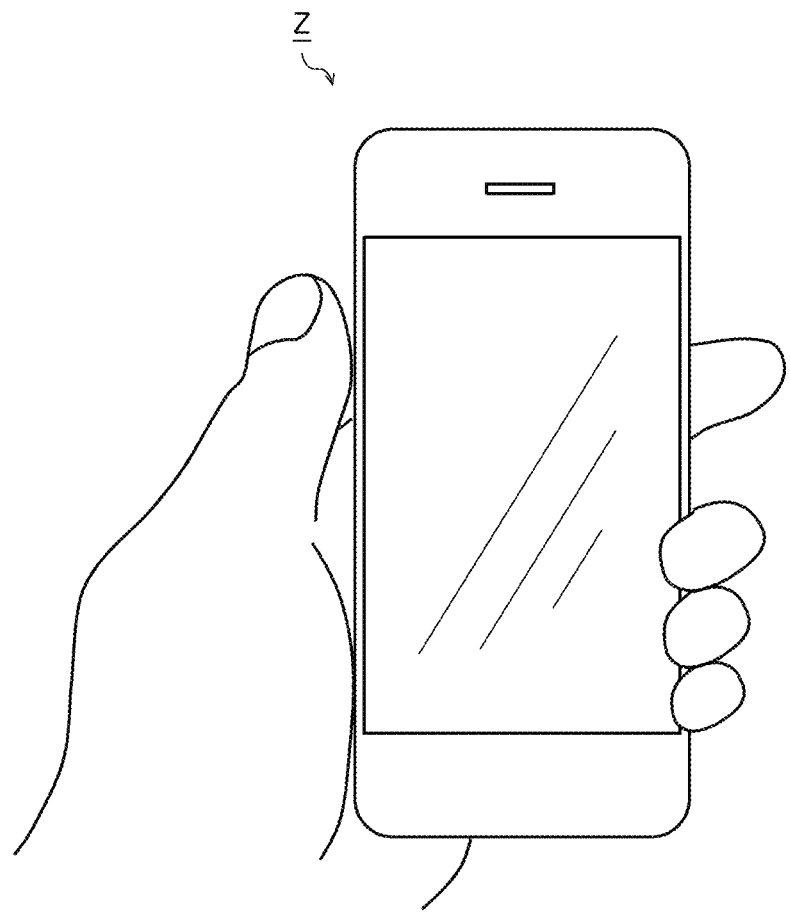
FIG. 15 is an exterior view of a smartphone.

The switching power supply 100 described thus far can be used as a power supplying means in different applications, examples including a television receiver X as in FIG. 13, a personal computer Y as in FIG. 14, and a smartphone Z as in FIG. 15. Needless to say, the switching power supply 100 can be applied to any other applications than those just mentioned.

<Further Modifications>

The various technical features disclosed herein may be implemented in any other manners than in the embodiments described above, and allow for any modifications made without departure from their technical ingenuity.

For example, a switching power supply in which an output feedback control circuit is incorporated may be configured to have a fixed switching frequency fsw (FIG. 1, etc.) or to have a variable switching frequency fsw (FIG. 12, etc.). Whether to employ current mode control or voltage mode control does not matter either.

An error amplifier may be either of a single output type or of a differential output type.

An output feedback control circuit can be applied not only to switching power supplies but also to power supplies of any other types, and even to devices other than power supplies such as servo mechanisms.

In this way, the various embodiments disclosed herein should be understood to be in every aspect illustrative and not restrictive. The scope of the present invention is defined not by the description of the embodiments given above but by the appended claims, and should be understood to encompass any modifications made in a sense and scope equivalent to those of the claims.

INDUSTRIAL APPLICABILITY

Output feedback control circuits according to what is disclosed herein find applications in switching power supplies, servo mechanisms, etc., in which output feedback control needs to be performed so that the output voltage or a feedback voltage commensurate with it remains equal to a predetermined reference voltage.

LIST OF REFERENCE SIGNS 100 switching power supply
110 switching output circuit
111 output transistor (PMOSFET)
112 synchronous rectification transistor (NMOSFET)
113 inductor
114 capacitor
120 feedback voltage generation circuit
121, 122 resistor
130 reference voltage generation circuit
140, 140a, 140b error amplifier
141 buffer
142 calculator
150 ramp signal generation circuit
160 oscillator
170 PWM comparator
180 control circuit
190 switch driving circuit
191, 192 driver
200 semiconductor integrated circuit device (power control device)
210 low-side current sensor
211 switch
212 resistor
220 information synthesizer
221, 222 resistor
230 information holder
231, 232 sample and hold circuit
240 error corrector
241 comparator
242 digital calibrator
243 error correction amplifier
244 capacitor
245 resistor
246 digital calibrator
247 error correction amplifier
250 on-time setter
Cc, Cp capacitor
Rc, Ro resistor
T1, T2, T3, T4 external terminal
X television receiver
Y personal computer
Z smartphone

The invention claimed is:

1. An output feedback control circuit comprising an error signal generator configured to generate an error signal between an output voltage, or a feedback voltage commensurate therewith, and a predetermined reference voltage, wherein the error signal generator includes:
a first signal processor configured to form a first path, the first signal processor including a first amplifier;
a second signal processor configured to form a second path, the second signal processor including a second amplifier; and
a digital calibrator connected to an input terminal of the first amplifier and configured to provide a differential input signal to the first amplifier,
wherein the first signal processor is configured to be more accurate than the second signal processor, and
the second signal processor is configured to be faster than the first signal processor.

2. The output feedback control circuit according to claim 1, wherein
a capacitor other than a parasitic element is connected to an output terminal of the first amplifier.

3. The output feedback control circuit according to claim 1, wherein
no capacitor other than a parasitic element is connected to an output terminal of the second amplifier.

4. The output feedback control circuit according to claim 1, wherein
a resistor is connected to an output terminal of the second amplifier.

5. The output feedback control circuit according to claim 1, wherein
the first amplifier is configured to have a first transconductance, and
the second amplifier is configured to have a second transconductance different from the first transconductance.

6. The output feedback control circuit according to claim 1, wherein the output feedback control circuit is configured to determine a low-frequency gain using the first amplifier and a high-frequency gain using the second amplifier.

7. The output feedback control circuit according to claim 1,
wherein
the first and second amplifiers are configured to generate, respectively, first and second error signals commensurate with a difference between the output voltage or the feedback voltage and the reference voltage.

8. The output feedback control circuit according to claim 7, further comprising a calculator configured to generate the error signal by performing addition or subtraction between the first and second error signals.

9. The output feedback control circuit according to claim 8, further comprising a buffer between the output terminal of the first amplifier and the calculator.

10. The output feedback control circuit according to claim 1, wherein
the first amplifier is configured to generate a first error signal commensurate with the difference between the output voltage or the feedback voltage and the reference voltage, and
the second amplifier is configured to output a second error signal commensurate with a difference between the feedback voltage and the first error signal.

11. A switching power supply, comprising:
a switching output circuit configured to generate an output voltage from an input voltage; and
the output feedback control circuit according to claim 1 which is configured to receive the output voltage, or the feedback voltage commensurate therewith, to perform output feedback control for the switching output circuit.

12. A switching power supply according to claim 11, wherein
the output feedback control circuit is configured to drive the switching output circuit by fixed-frequency operation so as to reduce the error signal.

13. The switching power supply according to claim 11, wherein
the output feedback control circuit is configured to drive the switching output circuit by fixed on-time operation so as to reduce the error signal.

14. The switching power supply according to claim 11, wherein
the output feedback control circuit includes
a low-side current sensor configured to sense an inductor current passing through a low-side switch in the switching output circuit to acquire low-side current feedback information and
an information synthesizer configured to combine the error signal, which is voltage feedback information, with the low-side current feedback information to generate synthesized feedback information, and the output feedback control circuit is configured to drive the switching output circuit based on the synthesized feedback information.

15. The output feedback control circuit according to claim 1, wherein the digital calibrator is configured to receive, as an input, the predetermined reference voltage and a calibration signal.

16. The output feedback control circuit according to claim 1, wherein an output of the first amplifier is configured to be applied to an output of the second amplifier.

17. The output feedback control circuit according to claim 16, wherein the output of the first amplifier comprises a first correction current and a second correction current, and wherein the first correction current and the second correction current are respectively applied to a first output current and a second output current of the second amplifier.

* * * * *